(12) United States Patent
Trainer

(10) Patent No.: US 7,752,090 B2
(45) Date of Patent: Jul. 6, 2010

(54) SYSTEM AND METHOD FOR REVERSING ACCOUNTING DISTORTIONS AND CALCULATING A TRUE VALUE OF A BUSINESS

(76) Inventor: David Trainer, 706 Woodleigh Dr., Nashville, TN (US) 37215

( * ) Notice: Subject to any disclaimer, the term of this patent is extended or adjusted under 35 U.S.C. 154(b) by 1593 days.

(21) Appl. No.: 10/636,932

(22) Filed: Aug. 7, 2003

(65) Prior Publication Data

US 2004/0039676 A1 Feb. 26, 2004

(51) Int. Cl.
*G06Q 40/00* (2006.01)
(52) U.S. Cl. .......................... 705/30; 705/35; 705/36 T
(58) Field of Classification Search ............... 705/36 R, 705/35, 37
See application file for complete search history.

(56) References Cited

U.S. PATENT DOCUMENTS

2003/0225652 A1* 12/2003 Minow et al. ................. 705/36

OTHER PUBLICATIONS

JPMorgan Chase 10-K Filing 2000.*
Hospital Industry, CSFB Holt Analysis: Compelling Valuations at Current Levels, Jun. 26, 2003, pp. 1-40.
AFG View.Com, http://www.afgview.com/tour/mainpage2.cfm?CFID=86270CFTOKEN=84230663.
Expectations Investing: http://www.expectationsinvesting.com/.
Rappaport; "Expectations Investing" Harvard Business Press, Boston, MA, 2001.
Rappaport; "Creating Shareholder Value", The Free Press New York, 1986.
McTaggart, et al. "The Value Imperative", The Free Press, New York, 1994.
Black et al. "In Search of Shareholder Value", FT Pitman Publishing, 1998.

* cited by examiner

*Primary Examiner*—James A Kramer
*Assistant Examiner*—James A Vezeris
(74) *Attorney, Agent, or Firm*—Duane Morris LLP

(57) ABSTRACT

A method for reversing accounting distortions of financial information, comprising the steps of obtaining a set of financial information regarding an entity, the financial information including accounting distortions and notes detailing said accounting distortions; analyzing the financial information and notes to determine an accurate economic model; and using said accurate economic model to automatically determine the true profitability of an entity and comparatively value a plurality of expectations with respect to the financial information.

56 Claims, 8 Drawing Sheets

|  | 5 Year History | Market Expectations | | | Investor Expectations | | |
|---|---|---|---|---|---|---|---|
| Value Growth Horizon (years) | 15-17 | 11 | 12 | 13 | 11 | 12 | 13 |
| ROIC-WACC* | -3% | 3% | 4% | 5% | 6% | 7% | 8% |
| Revenue CAGR | 100% | 30% | 29% | 29% | 33% | 32% | 32% |
| Current Implied Value | $55-60 | $40 | $47 | $54 | $57 | $64 | $73 |
| Implied 12-Month Target Price | | | | | $63 | $72 | $81 |
*WACC is 11%.
Fig. 10
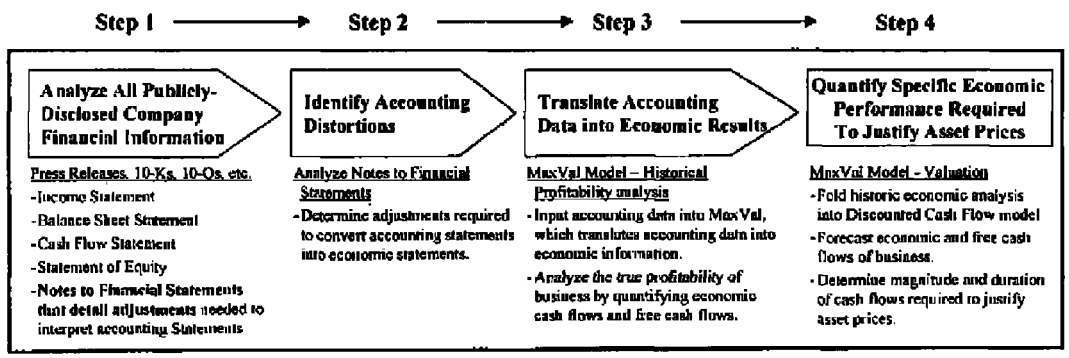
Fig. 11
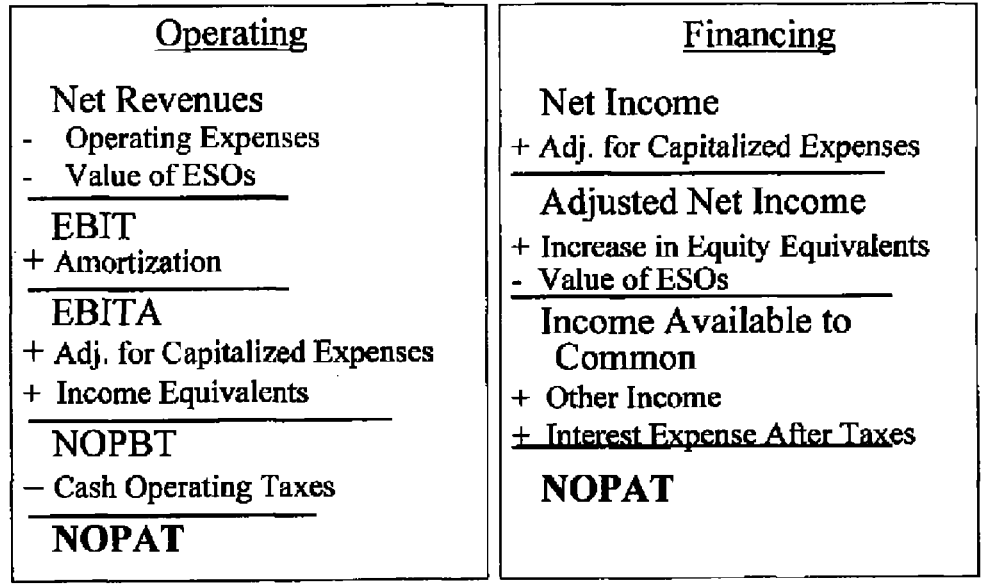
Fig. 12

Free Cash Flows

Cumulative free cash flow generated during the business' GAP discounted by WACC to present value Plus Perpetuity Value of free cash flows generated at end of the business' GAP discounted by WACC to present value.

Basic Formula:
Present value of Free Cash Flow during GAP
+ Residual Value of Free Cash flows at end of GAP
= Present Value of the Business' Total Cash Profits

Economic Profits

Cumulative economic profits generated during the business' GAP discounted by WACC to present value Plus Perpetuity Value of economic profits generated at end of the business' GAP discounted by WACC to present value.

Plus

All capital invested In the business prior to the creation of future economic profits Basic Formula:
Present value of Economic Profits during GAP
+ Residual Value of economic profits at end of GAP
+ Beginning invested Capital
= Present Value of the Business' Total Cash Profits

Present Value of the Business' Total Cash Profits
+ Excess Cash
+ Current Value of Unconsolidated Subsidiaries
- Current Value of Preferred Stock
- Current Value of Total Debt owed Creditors
- Current Value of Minority Interests
- Current Value of Outstanding Employee Stock Options
= Shareholder Value
Divide Shareholder value by current number of basic shares outstanding
= Value per each share in the business

Fig. 15

SYSTEM AND METHOD FOR REVERSING ACCOUNTING DISTORTIONS AND CALCULATING A TRUE VALUE OF A BUSINESS

FIELD OF THE INVENTION

The present invention relates to the field of investment decision-support systems and methods, and more particularly to a system and method for analyzing financial information of companies including accounting distortions based on extraction or elucidation of underlying economic data.

BACKGROUND OF THE INVENTION

The traditional investment analysis construct is either flawed or quite inefficient. As noted on the front flap of the book jacket for *Expectations Investing*, by Alfred Rappaport and Michael Mauboussin:

"About 75 percent of all investors deliver returns below those of passive funds. Why? In part, it's because proven methods for valuing assets are too complex to apply—causing investors to rely on commonly used benchmarks such as current price-earnings multiples that simply don't reflect how the market prices stocks"

Profitability Analysis

The traditional profitability analysis, used by most investors for evaluating the profitability of a company, employs financial information from the Income Statement as published by all publicly-traded companies every 3 months in their earnings press releases. Though companies provide much more pertinent information, most investors do not have the time or incentive to assess information from the company's balance sheet, other financial statements or, most importantly, the Notes to the Financial Statements. For the most part, only the income statement is read closely and used by analysts to create "earnings models." The earnings models simply use formulas programmed within Microsoft Excel to recalculate the numbers in press releases, 10-Qs or 10-Ks for historical analyses. In turn, these historical analyses are extended forward to aid analysts in forecasting earnings. 10-Qs and 10-Ks are the formal names of the quarterly and annual financial statements that the Securities and Exchange Commission require companies to publish within 90 days of the end of the reporting period. This process explains how analysts or analyst teams arrive at earnings estimates. The basic process analysts use to evaluate profitability of publicly traded companies is as follows. A company issues a press release with its quarterly earnings report, including income statements for the most recent quarter. Analysts use the data in the income statement to update a model, which is structured based on the income statement in the press release. Analysts then make presumptions to forecast revenue growth and profit. Assumptions are built on historical results as recorded.

Disproportionate Focus on Earnings and Earnings Per Share (EPS)

The large majority of investors rely on earnings or earnings per share (EPS) to evaluate the profitability of publicly traded companies. As noted above, this data is fairly easy to access, model and compute since it comes directly from companies in the form of an income statement in press releases, 10-Ks or 10-Qs or financial data aggregators like FirstCall. We will refer to the data that come directly from the Income Statement as "reported," e.g. reported earnings. There are many potential adjustments to reported data, but very few that are applied consistently. The large majority of investors focus their analytical efforts on the accounting metrics as reported. Those adjustments to these accounting numbers that are applied consistently (e.g. operating earnings) provide little reparation to the distortion from cash flow that accounting metrics present. The main problem with relying on reported numbers that SEC financial documents were designed by accountants for credit analysis rather than investors for investment evaluation. There are entire books devoted to delineating the shortcomings of accounting metrics, however, a few are detailed herein. The income statement and balance sheet from press releases, 10-Qs and 10-Ks do not reflect:

True cash flow of the business
True operating profit of a business
True liabilities of a company
True costs of employee compensation
Capital costs required to generate the earnings All too often, the income statement includes non-operating gains and losses that obfuscate the normal cash flow of the business. In addition, the income statement is prone to many other accounting distortions that companies exploit in order to "manage their earnings."

In summary, earnings are useful only as a proxy for cash flows. When cash flow and earnings diverge, earnings are useless. Unfortunately, too many investors operate blind to this fact and make themselves and their clients are vulnerable to undue investment risk. Other common accounting profitability measures (ROE, ROA) are based on earnings. If one starts with a bad assumption (i.e. that earnings are true measure of profitability), it is easy to see how use of these measures may lead to distorted results. Most other accounting metrics (e.g. Debt/Equity, Current Ratio, etc.) used by investors are not performance measures. They are intended to aid accountants and credit analysts in performing other tasks besides valuation.

Traditional Valuation Expects Too Much from Multiples Analysis

When investors base their valuation analysis on a business' profitability, they have the correct intention. Unfortunately, flaws in the large majority of analysts' profitability assessments cause their valuation to be flawed. For example, a price-earnings ratio (P/E) divides a company's stock price per share by is earnings per share (EPS) and, as a consequence, falls victim to the accounting distortions of EPS. Any valuation methodology that builds on a poor assumption is flawed.

It is no secret that earnings and EPS provide poor insight into the true profitability of businesses. Many investors use valuation multiples of other proxies for cash flow such as Earnings Before Interest, Taxes, Depreciation and Amortization (EBITDA) and EBIT. However, these measures, despite the ease with which investors may calculate them, are prone to many of the same distortions of other accounting metrics. Though they can alleviate some accounting distortion, they are not accurate representatives of the true cash flow of a business. Accordingly, the price-to-revenues ratio moves the valuation process even farther from the economic profitability of a business as a business' value in this construct is based on its revenues with little or no attention paid to the profits it may or may not derive from those revenues.

Another common valuation multiple is the Price-to-Book Value ratio. This ratio does not even attempt to value the company based on its cash flows. Even so, the book values analysts use are often an inaccurate assessment of the equity invested in the company. The traditional valuation process is an extension of a flawed profitability evaluation process, as follows. A quarterly earnings report, as represented in a company-issued press release presents earnings results for the most current quarter. These include, or may be used to readily calculate earnings, EPS, and ROE. Analysts update their earnings models based on the reported information. The analysts structure their models based on the income statement in the press release, and employ the Earnings, EPS, and ROE. The analysts then develop forecasts, based on assumptions for revenue growth and profit. Assumptions are built on historical results as recorded in the model. Analysts then perform a valuation by applying stock price multiples to accounting metrics such as EPS, EBITDA or book values, to yield such calculated metrics as P/E, Price/EBITDA, Price-to-revenues multiple, and the like.

In essence, valuation multiples are short cuts to proper discounted cash flow (DCF) analysis. They are useful only by comparison to comparable companies, but do not provide an adequate substitute to assessing the lifecycle cash flows of a business. Other less popular measures, such as EVA and CFROI, offer improved cash flow analysis but are not alternatives to the proper discounted cash flow (DCF) valuation process either.

Most DCF Analyses are Flawed

Those investors that do use DCF analysis tend to do so incorrectly. The most common mistake is that investors arbitrarily apply a five or ten year forecast horizon to the lifecycle of a company's future cash flows. Though five or ten years may be appropriate for some businesses, it is certainly not applicable to most. Forcing all DCF analyses into 5 or 10-year frameworks is much simper than building separate frameworks for every company. Most investors add a terminal multiple to the present value of the five or ten-year forecasted cash flows. These terminal multiples fall prey to the same deficiencies as the multiples described above. In fact, most of these terminal values are usually based on a P/E or Price-to-EBITDA multiples. In essence, traditional DCF analyses reflect an attempt by analysts to combine simpler valuation tools. The result is a more complicated valuation process that produces little if any incremental insight since they are, in essence, extensions on poor original assumptions. In addition, most investors use DCF models to compute target prices based on their assumptions for the company's growth and profitability. Like a shot in the dark, these assumptions are often made in a total vacuum with no comparison to the assumptions embedded in the stock price. Lastly, analysts all too often do not discount true cash flows. Instead, they use an accounting approximation.

SUMMARY OF THE INVENTION

According to the present invention, the reported information for a company is analyzed to account for or correct accounting distortions, which may then be used in a rigorous or accurate discounted cash flow calculation. Once the economic cash flows of a business have been accurately evaluated, one can rely on bedrock financial theory to compute the value of a business.

The first step to proper valuation is evaluating the true profitability or economic cash flows of a business. This process is traditionally both time consuming and complex. It requires the investor to look far beyond the Income Statement and Balance Sheet. Though financial statements were created by and for accountants, they should provide the detailed information in the Notes to Financial Statements needed to convert the accounting statements (Income Statement and Balance Sheet) into an economic assessment of cash flows. FIG. 1 illustrates the proper process for evaluating the true profitability of a business. As shown the reported quarterly earnings report, including notes that detail adjustments needed to convert accounting statements into economic cash flows, are analyzed. The accounting statements and notes are then converted to an economic form to remove distortions, to produce a model of economic cash flows, ROIC, WACC, and other economic value drivers. This model may then be used to produce an accurate valuation and to determine and understand implicit assumptions in market pricing, such as the magnitude and duration of cash flows required to justify market price.

The Basic Valuation Recipe—Same for Every Asset

Professors Merton Miller and Miller Modigliani in the late 1950's and early 1960's showed that the stock market equates the value of a firm to the present value of its future cash flows. For reasons stated previously, the large majority of investors have not adhered to this truth, or at least been able to accurately gauge the target value. Before the recent improvement in computing power, it would have been too difficult for most investors to engage in proper valuation processes. Thus, investors invented shortcuts to compensate for the lack of adequate tools required to analyze the large amounts of information required to value stocks appropriately. Often, investors attempt to value stocks by combining multiple shortcuts, which is analogous to building a puzzle without all the necessary pieces. In reality, once one has all the correct valuation pieces and uses these pieces in the proper framework, the puzzle is much, much easier to build. Moreover, the valuation picture is much clearer when using the correct pieces as illustrated in FIG. 2, which illustrates how the proper approach to value every type of asset is the same. Only the terminology differs. In this case, we juxtapose bond valuation with stock valuation to show how the relevant terms correspond to each other. For example, equity cash flow is equivalent to fixed income coupon payments and the Value Growth Horizon for stocks is analogous to the maturity date for bonds. Risk for bond investors comes from interest rate fluctuation. Risk for equity investors is quantified by the Cost of Capital, which quantifies the risk assigned to the stream of cash flows.

We extend the framework to cover more detailed financial analysis. FIG. 3 shows how business cash flows can be broken down into more common business terms of revenue and Return on Invested Capital (ROIC).

We can replace the cash flow variable and focus on the three common variables with which investors are most familiar: (1) Revenue Growth, (2) Risk-Adjusted Returns (Return on Capital minus Cost of Capital), and Value Growth Horizon, as shown in FIG. 4. See definitions of these terms are in the Appendix.

Again, as shown in FIG. 5, we can extend the framework to cover more detailed financial analysis.

The valuation framework according to the present invention offers analysts and asset managers profound efficiency gains. No more time needs to be spent on building historical analyses. No more time need be spent discussing how to measure profitability or value a company. For once, analysts will be able to focus on a single profitability measure robust enough to apply to any and every company. Separate resources allocated to Value versus Growth investment styles can be consolidated as investment idea generation recognizes that growth for growth's sake is not necessarily a good thing. FIG. 6 shows a chart of how the discounted cash flow framework illustrates that growth from companies not earning returns on capital (ROIC) above their cost of capital (WACC) destroy value. Indeed, the faster a business with ROIC<WACC grows, the more value it destroys. In addition, FIG. 6 defies the myth that P/E ratios determine value. The truth is that P/Es are a function of value not a determinant. FIG. 6 shows use of a DCF model to calculate the actual P/E ratio for a stock given the relevant earnings growth and ROIC factors. The resulting P/E ratios show that a company must achieve ROIC greater than WACC for growth to contribute to the value of a business. Growth has no impact on value if the business' ROIC=WACC. Growing a business that earns an ROIC below WACC increases the rate of value destruction.

Economics Drives Market Valuations

The economics (we use the terms ROIC and WACC in our economic vernacular) of the business drive the value of the business. Accordingly, the investment decision process should incorporate the analysis of a business' economics.

Indeed, FIG. 7, which shows that market values are a function of cash flow (S&P Industrial Index, 1997), and illustrates the importance of ROIC to valuation. In essence, this chart shows that Risk-Adjusted Returns (ROIC-WACC: Return on Invested Capital minus the weighted average cost of capital) explains 79% of the changes in stock market valuations for all companies in the S&P Industrials. Market valuation is measured in terms of the Enterprise Value divided by Invested Capital Ratio. As noted earlier, ROIC-WACC is the proper method for measuring the profitability of a business. Indeed, this analysis confirms that the market (in aggregate) relies heavily on this measure to value stocks. A correlation coefficient over 40% means there is a statistically significant relationship between two variables in a regression analysis like this one. Just as compelling are the results of performing a similar analysis with other accounting-based metrics. The correlations come out with very low results, typically below 10% and often near zero with no statistical relationship at all.

To test the robustness of this model, data from 45 technology companies over the past eight years were analyzed using economic cash flow models. Using the same framework as used in FIG. 7, high-tech growth technology companies were chosen because most investors believed technology stock were 'growth' stocks and, hence, not subject to the market's requirement for economic profits. FIG. 8 shows this analysis.

The results of the analysis of technology companies lend strong support to the validity of the framework. Further support for the credibility of the framework comes from the "t-stats," which should be over 2, and "p-values," which should be less than 5%, to verify the integrity of the analysis. A p-value measures the probability that the analyst happened to pick a favorable sample of companies. Rather, these regression statistics show there is less than a 1 in 100 chance that the results were a fluke.

Testing the Traditional Construct: the P/E-to-Growth Framework

To provide a point of comparison, we present the explanatory power of the P/E-to-Growth valuation framework, which is one of the most popular valuation short cuts used by Wall Street analysts. This framework rests on some valid financial theory, namely that the amount an investor is willing to pay for a dollar of earnings in the immediate future should be directly related to the rate at which he/she expects the earnings stream to grow. (Frank K. Reilly, *Investment Analysis and Portfolio Management.* 4th Edition, Dryden Press, 1994, p. 392.) Basically, the P/E-to-Growth framework relies on the false logic that links a company's valuation growth rate to its price-to-earnings ratio. Indeed, equity research reports often quote higher earnings growth rates to justify higher P/Es and target prices. The simplicity of the framework makes it a seductive tool in the fast-paced stock market environment. However, as the results of FIG. 9 show, the framework stumbles on the same poor assumption that most Wall Street analysts make: accounting earnings (or EPS) are a good proxy for economic earnings. If this assumption were true, the statistical relationship between P/E multiples and earnings growth rates should be strong. FIG. 9 clearly indicates otherwise, with a 0% correlation between the P/E ratios of 32 technology companies and their actual five-year earnings growth rates. It's worth noting that the analysis is based on actual earnings data-instead of analysts' consensus estimates of forward five-year earnings—to calculate five-year forward earning growth rates of each company. Accordingly, the analysis also used actual earnings data—instead of analysts' consensus estimates of forward 12-month earnings—to calculate 12-month forward P/Es. One could argue that the framework is predicated on future growth, not historical growth.

Nevertheless, several of these analyses were performed using both actual and expected growth rates, and the results were the same: there is no statistically sound relationship between earnings and P/E ratios or any sort of market valuation technique. The bottom line is that the P/E-to-Growth valuation framework is flawed and investors should not rely on earnings to value stocks.

Continuity of Cash Flow Focus Offers a Global Analytical Framework

The use of the system and method according to the present invention will allow a consistent terminology to be used for comparison across all companies, industries and sectors. Inferior accounting-based metrics no longer need be used to analyze companies. With one standard performance measure, analysts can trust Risk-Adjusted Returns to present the truest measure of the economic profitability of a business. More important, use of these metrics will undermine the ability to obfuscate the economic profitability of a business by using any number of accounting metrics to manipulate their presentations of a business' profitability.

Expectations for Future Economic Performance Drive Changes in Market Valuation

When Miller and Modigliani proved that the stock market value of an asset is a function of the discounted present value of its future cash flows, they gave investors an overlooked method to simplify stock picking: buy low expectations and sell high expectations. Consider that the market price reflects the aggregate market's opinion of the future financial performance of the company. Anytime an investor buys a stock with the expectation it will rise, he or she must believe the market's expectations for the company's future financial performance are too low by a significant margin. To the extent that a given business performs better than the market expects, its stock price will adjust upward to the point where it reflects the full extent of the company's higher performance level.

On the other hand, an investor who shorts a stock must believe that the market's expectations for the company's future financial performance are too high. To the extent that a given business performs worse than the market expects, its stock price will adjust downward to the point where it reflects the full extent of the company's lower performance level. If an investor's expectations for the future performance of a business are similar to those of the market, then there is no reason for the investor to buy or short the stock. Accordingly, determining the investment merit of a given stock boils down to comparing the investor's expectations for future financial performance with those of the market. There are three basic investment decisions an investor can make, and they correlate perfectly with the expectations analysis framework according to the present invention.

There is a natural correlation between competent expectations analysis and investment decisions. By definition, anytime an investor buys or sells a stock, he or she takes a position contrary to that of the overall market. This point assumes the investor wishes to earn returns on his/her investments that are greater than the market rate of return. Otherwise, an investor could put his/her money in an S&P 500 index fund and lock in the market rate of return, assuming that the S&P 500 is the market benchmark. Whether an investor buys or shorts a stock, he or she does so with the belief that the stock price will change at a rate greater than that of the overall market, otherwise, the investor is better suited putting his or her money in an index fund. Only material changes in the present value of expected cash flows can drive material changes in a stock price. Consequently, the investor must believe that an unexpected change in the market's assumptions for the value of future cash flows will occur. At the time of investment, the investor believes the stock price is too high or too low and that it will adjust in the desired direction in the amount of the difference between the investor's expectations and those of the market. Low expectations for future economic performance generally refer to undervalued stocks, which trigger a buying opportunity. High expectations generally refer to over-valued stocks, which triggers a (short) selling opportunity. When market expectations are in line with those of the investor, generally no changes are made in the portfolio.

FIG. 10 shows an expectations analysis valuation chart for Siebel Systems. The chart shows that the analyst's expectations differ materially from those of the market. As a result, the analyst makes a buy recommendation. Any reader can assess the analyst's justification for the buy recommendation and determine for him or herself whether or not the analyst's higher expectations are likely to be correct. This approach greatly simplifies the investment decision-making process by demystifying and illuminating not just market expectations but also those of the analyst. Contrary to currently available tools, the present invention offers unprecedented insight and transparency into the valuation of assets by making the future cash flows required to justify any price explicitly clear.

Simplifying the Investment Process by Demystifying Market Valuation

FIG. 10 illustrates the simplicity of MaxVal™ model's investment decision framework. In this figure, the models show what level of performance is required to justify the current market price along with the performance required to justify a range of possible target prices. Both of these analyses are juxtaposed against the five-year historical average performance of the company. With this information, the degree to which future performance must differ from past performance in order to justify not just the market price but also the target price is clearly demonstrated. MaxVal™ also makes it easy for analysts to perform sensitivity analyses and determine with unprecedented accuracy the impact of different financial performances on stock prices and the underlying future financial performance required to justify such prices. Given such information, the investment decision process is simplified down to whether or not an investor has expectations that differ from the market's expectations to a great enough degree to warrant making either a long or short investment. In essence, all the modeling and valuation work is done for the investor allowing him or her to concentrate efforts on strategic assessment.

It is therefore an object of the invention to provide a system and method for reversing accounting distortions of financial information, comprising the steps of obtaining a set of financial information regarding an entity, the financial information including accounting distortions and notes detailing said accounting distortions; analyzing the financial information and notes to determine an accurate economic model; and using said accurate economic model to automatically comparatively value a plurality of expectations with respect to the financial information.

It is a further object of the invention to provide a system and method for reversing accounting distortions in financial information, wherein the financial information comprises publicly reported financial information, documents filed with the U.S. Securities and Exchange Commission, press releases or other published documents. The financial information may also comprise a series of historical datum regarding a respective parameter. The entity may be, for example, a publicly traded corporation, although other types of entities may be analyzed, and the particular instrument being values need not be common stock of a publicly traded corporation.

It is a further object of the invention to provide a system and method for reversing accounting distortions to financial information, wherein the accounting distortions relate to one of more of employee stock options, goodwill, intangibles, mergers and acquisitions, employee pensions, debt covenants, capital leases, operating leases, revenues, deferred revenues, barter transactions, contingent liabilities, accrued reserves, loan loss reserves, realized and unrealized gains on securities held to maturity or available for sale, restructuring, non-recurring gains and losses, deferred taxes, and convertible debt and preferred stock or any non-operating items that cause reported results to obfuscate economic reality.

The economic model may be implemented within a computer spreadsheet, or as separate software applications which query a database. The model may produce a graphic output of profitability, a graphic output of value of the entity, or more generally a graphic output of at least one set of parameters included within said accurate economic model based on an ad hoc request from a user, or a graphic output representing a plot of a plurality of sets of expectations, each differing with respect to at least one parameter.

According to another object of the invention, the plurality of expectations may comprise one or more of an anticipated revenue growth, an anticipated profitability, an anticipated sustainability of profitable growth, a value and/or margin of operating profit, gross, earnings before interest taxes and amortization, earnings before interest taxes depreciation and amortization, taxes, and net operating profit after tax, a value and/or ratio of change in value to change in revenue and/or ratio of revenue to value or net working capital, adjusted net working capital, fixed assets, adjusted fixed assets, invested capital and adjusted invested capital, all current asset items, all fixed asset items, all current liability items, all long term liability items, total assets, and adjusted total assets.

According to a further object of the invention the comparative valuation of a plurality of expectations with respect to the financial information are presented as a chart or an output graph.

It is another object of the invention to provide a system and method for reversing accounting distortions of financial information, comprising the steps of obtaining a set of financial information regarding an entity, the financial information including accounting distortions and notes detailing said accounting distortions; analyzing the financial information and notes to determine an accurate economic model; and using said accurate economic model to automatically calculate a minimum future target price of an asset that is required to justify a long or short investment in the entity and/or a future performance required to justify a target price of an instrument reflecting a value of the entity.

It is a further object of the invention to provide a method for converting accounting information into economic profitability information, comprising the steps of obtaining a set of accounting information for an economic unit; recognizing economic distortions in the accounting information; automatically remediating the recognized economic distortions, to produce economic profitability information; and using the economic profitability information to determine the economic performance implied by a valuation of the economic unit, under at least one future financial scenario.

It is a still further object of the invention to provide a method of assessing valuation of a equity security based on accounting information associated with the underlying asset, the accounting information including financial statements and notes prepared in accordance with generally accepted accounting principles, comprising modeling economic cash flows of the asset by recognizing and remediating accounting distortions present in the financial statements; determining a present implied set of financial performance parameters required to justify a present market valuation of an asset; modifying at least one parameter of the set of financial performance parameters based an a differing belief in future market performance associated with the asset, than that implicit in the present market valuation; and determining the impact on the value of the equity security based on the modification in the at least one parameter.

Another object of the invention is to provide a method for identifying differences between market-implied future performance parameters and a user's differing future financial performance parameters, comprising extracting market-implied future performance parameters from accounting reports, modeling consensus estimates for future financial performance and market price; receiving from the user a differing financial performance parameter; modeling the future performance based on the differing financial performance parameter; and presenting modeled results of consensus forecasts and modeled results of users' forecasts, to the user as future profitability, future growth, and duration of future profit growth parameters.

The present invention provides, as an object, to a report comprising an expression of the economic performance of a equity interest, derived from reported financial performance according to standardized accounting principles; an expression of historical performance of the equity interest; and an expression of relationship between the performance required to Justify a plurality of equity valuations, future profitability, future growth, and duration of future profit growth relating to the equity interest.

These and other objects will become apparent from a review of the detailed description of the preferred embodiments and drawings herein.

BRIEF DESCRIPTION OF THE DRAWINGS

FIG. 10 shows a chart-form output of a model which shows what level of performance is required to justify the current market price, along with the performance required to justify a range of possible target prices;

FIG. 11 shows an analytical framework according to the present invention;

FIG. 12 shows the calculation of NOPAT: The after-tax operating cash generated by the business, excluding non-recurring losses and gains, financing costs, and goodwill amortization and including the compensation cost of employee stock options (ESOs);

FIG. 14 shows the calculation of the value of the business: Each discounted cash flow page quantifies the cash flows produced during a company's Growth Appreciation Period (GAP), which represent the value of the company's assets;

FIG. 15 shows the calculation of the value available to shareholders;

DETAILED DESCRIPTION OF THE PREFERRED EMBODIMENTS

Figure 1:
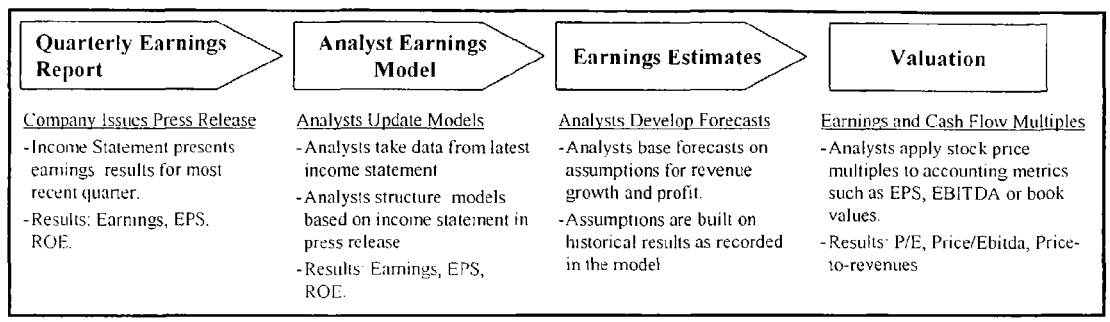
FIG. 1 shows the analytical process for valuation of an entity.
Figure 2:
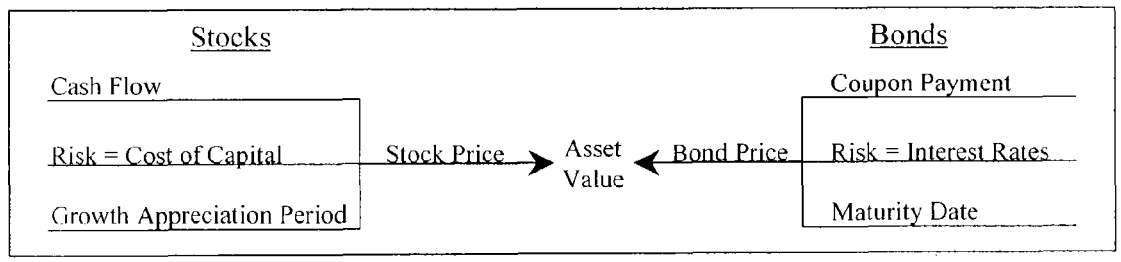
FIGS. 2-5 show the basic valuation recipe, which is the same for bonds and stocks, as well as other assets.
Figure 3:
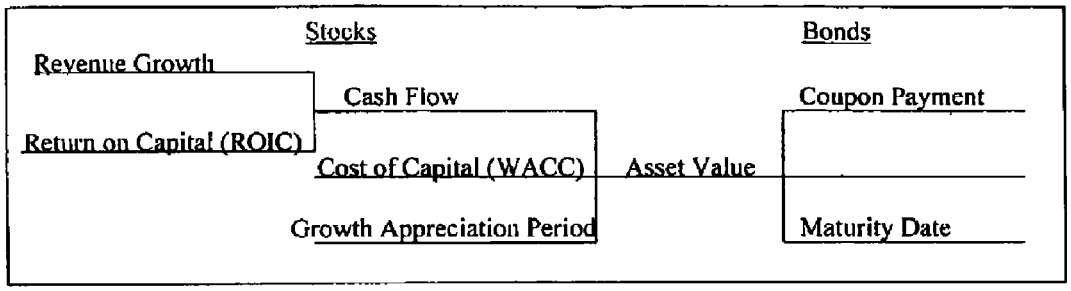
Figure 4:
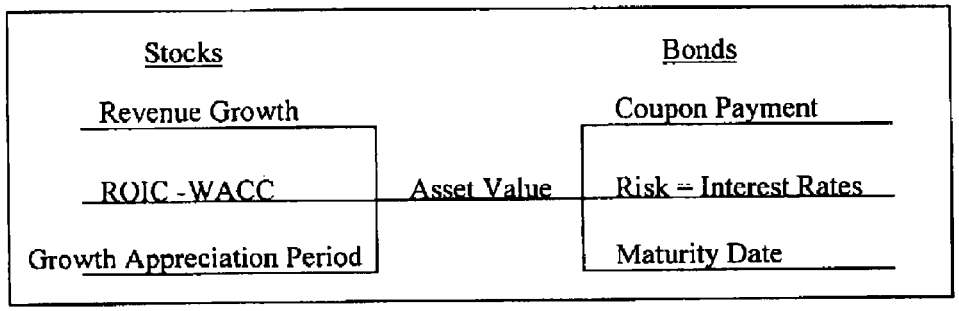
Figure 5:
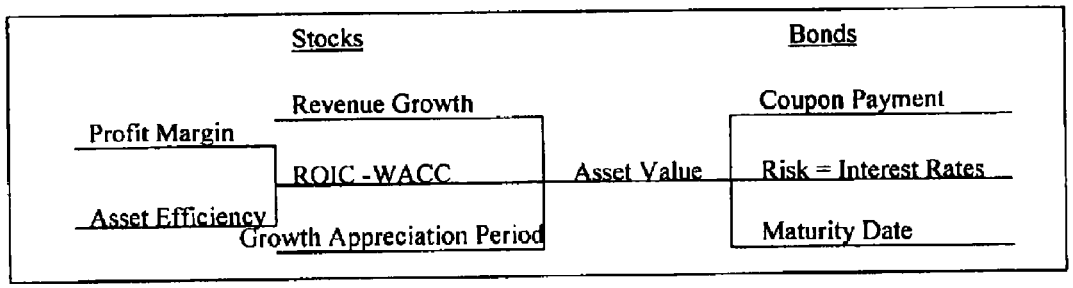
Figures 6, 7:
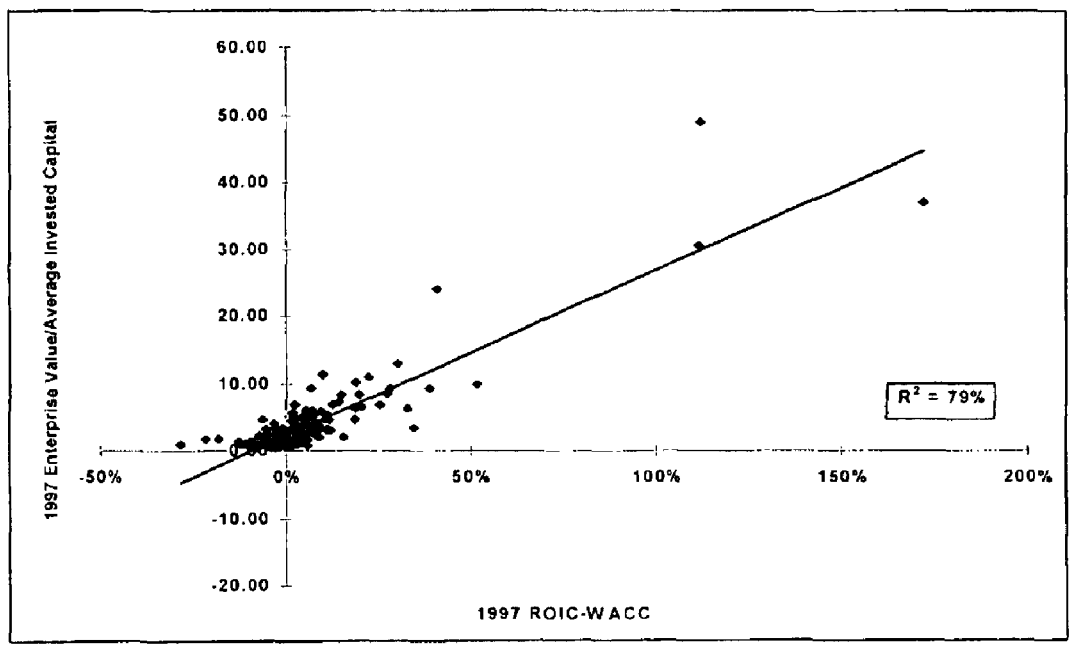
FIG. 6 shows a chart demonstrating that return on invested capital is the critical driver of value.
FIG. 7 shows a plot which demonstrates that market values are a function of cash flow.
Figure 8:
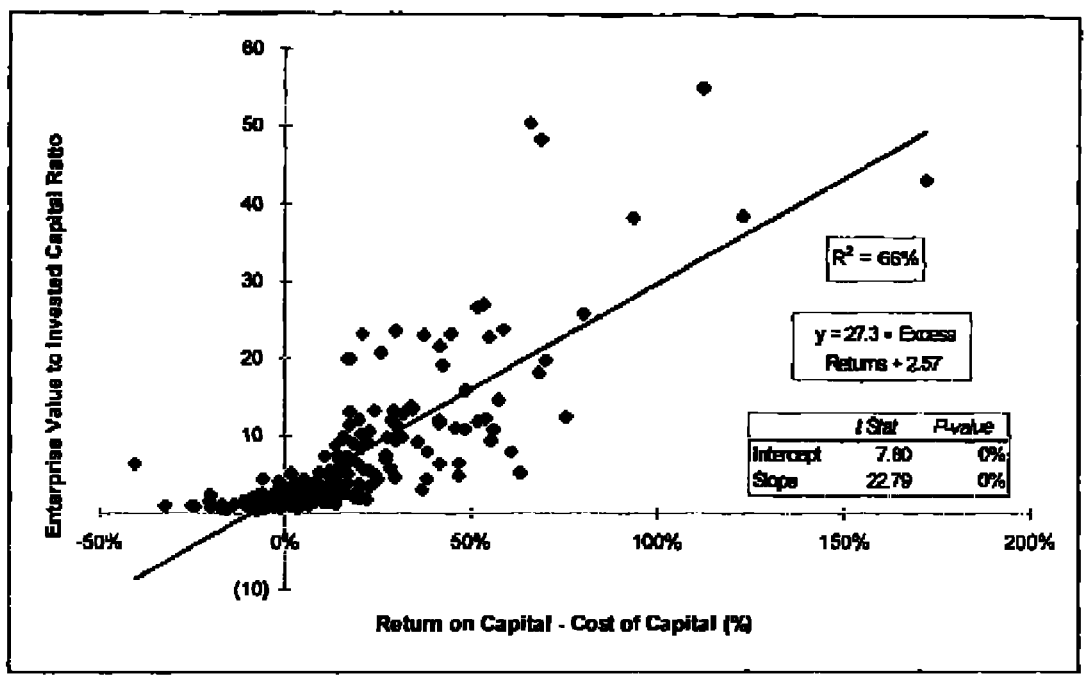
FIG. 8 shows a plot which demonstrates that the stock market values cash flow.
Figure 9:
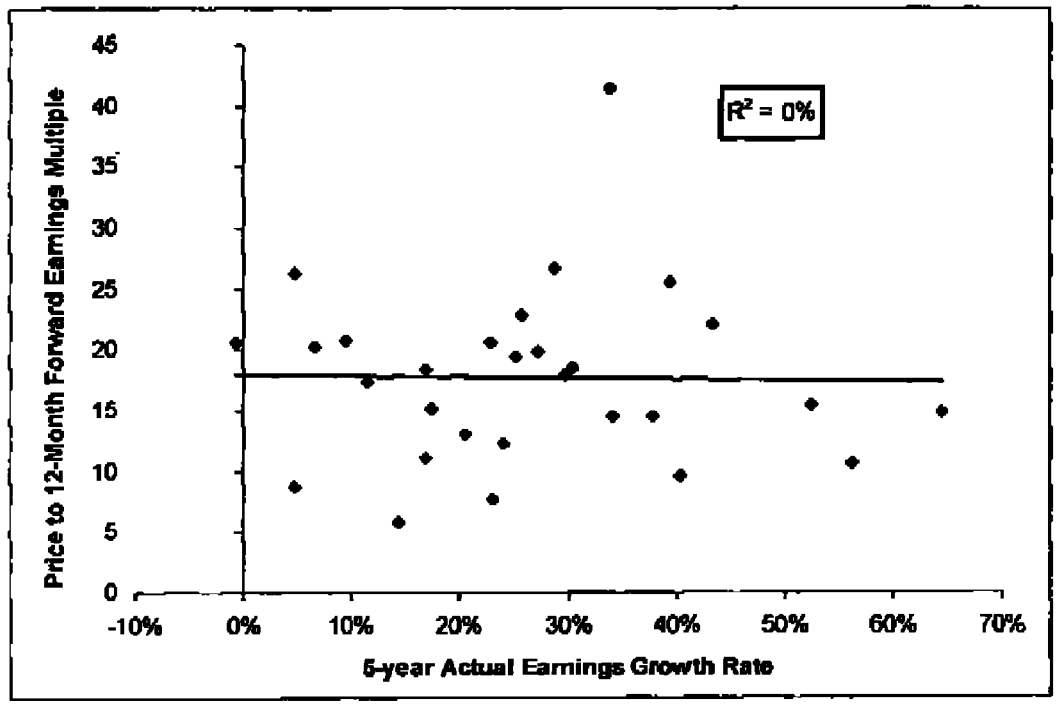
FIG. 9 shows a plot which demonstrates that earning growth rates do not determine price/earnings multiples.

The invention will now be described by way of the drawings, in which corresponding reference numerals indicate corresponding structures in the figure.

FIG. 11 illustrates the overall investment analysis process and methodology enabled by the MaxVal™ model according to the present invention. Each company is separately processed and analyzed. A MaxVal™ model is thus generated for each company analyzed. To reap maximum gains from the investment analysis and methodology, steps 101, 102, 104, and 104 should be performed for each individual company. Nonetheless, benefit can be achieved by employing any of the particular subprocesses.

The process generally operates under human guidance and control, although fully automated data acquisition and preliminary analysis may also be possible. This step requires access to all the financial information published by the company to be analyzed, starting, with but not necessarily limited to the company's 10-K and 10-Q filings. The MaxVal™ model is hosted on a general purpose computer, such as an industry standard personal computer, for example using the Microsoft Excel spreadsheet as a modeling environment.

Additional information useful for performing the process includes the company's current stock price, the expected equity market return as estimated by a reputable firm (e.g. Alcar), the company's beta (a standardized measure of systematic risk that is used with the Capital Asset Pricing Model for calculating the cost of equity capital; beta relates the covariance of a stock to the variance of the market portfolio), the risk-free rate as reflected by the 10-year or 30-year treasury bonds, historical split-adjusted stock prices along with the split-adjusted number of diluted and basic shares outstanding for the past several quarters and years.

As shown in FIG. 11, the first step is to analyze the available company financial information. According to one embodiment of the invention, the subsets of the information analyzed are varied, for example publicly available information and information available to insiders, to determine whether such information is "material" on the basis of its economic impact. Likewise, a sensitivity analysis may be performed with respect to various information to determine the relationship of changes in the input values and presumptions, to the output. Those values with the most sensitivity may be investigated carefully, to ensure that the most accurate values are employed. Those values which have little or no effect on the output within a reasonable range of certainty, may be more readily accepted without extra due diligence.

The information generally considered relevant for this analysis, for many publicly traded companies, includes press releases, SEC filings of financial statements, such as 10-K, 10-Q, etc., income statements, balance sheet statements, cash flow statements, statement of equity, and notes to financial statements.

The second step is to identify distortions and potential distortions to the financial statements. In this case, notes the financial statements are typically particularly important. In this step, adjustments required to convert accounting statements into economic statements are analyzed and formulated.

The third step is to translate the accounting data into economic results. The MaxVal™ model is then used to perform a historical profitability analysis. Accounting data is input into MaxVal™, which translates accounting data into economic information. The true profitability of the business is then analyzed by quantifying economic cash flows and free cash flows.

The fourth step is to quantify specific economic performance required to justify asset prices. This step is an optional extension of the process, employing the distortion-adjusted accounting data to determine the implicit market assumptions underlying stock price. This step therefore makes transparent the various economic factors, and allows an analyst to further analyze the result for various purposes, such as determining the effect of a change in various market parameters on the expected performance of the stock and compare the stock to other equities on a detailed level.

These steps are described in more detail below.

Step One—Gathering All Valid Disclosure

Analysts typically gather all publicly disclosed information on the specific company he/she wishes to analyze. This information includes, but is not limited by, the following: all 10-Q and 10-K filings, all press releases, historical and current asset (stock) prices and, where relevant, shares, both diluted and basic, outstanding.

Analysts also typically ensure the validity and integrity of all gathered information. The validity and integrity of the financial information gathered is measured by the source of the information. Data is valid only after it has been officially reviewed by an independent auditor and the relevant regulatory authority. These official reviews are clearly noted in valid financial disclosures. The Securities and Exchange Commission is the official regulatory authority for financial information provided by publicly-traded companies. Of course, it is understood, that the MaxVal™ model may also be employed with other data sets, for example preliminary disclosure from primary sources, such as telephone conferences or press releases, or from secondary sources, such as anecdotal reports, hearsay, and conjecture.

Step Two—Identifying All Accounting Distortions

To perform Step two, analysts should be equipped with both (1) a mastery of accounting rules and ability to interpret companies' financial disclosure according to these rules and (2) a mastery of economic principles needed to translate the accounting disclosure into an economic analysis of companies' financial disclosure. It is understood that this step may be performed by a team of individuals, and may also be automated, in an intelligent computing system environment.

If equipped with the skills detailed above, analysts (human or automated) are able to identify adjustments made to the disclosed accounting data that translate these data into an economic analysis of the performance of the business. It is noted that there is typically little discretion in the application of the rules for adjusting the accounting data; rather, the skills required are directed to identifying when a translation of an accounting distortion should be applied to yield the economic data, and what the appropriate translation is.

According to current regulatory disclosure requirements, the typical accounting distortions present in documents filed with the US Securities and Exchange Commission and documents prepared in accordance with its requirements are as follows. This list does not include all the necessary adjustments and it may change as regulatory disclosure requirements change:

1. Calculation of Net Operating Profit After Taxes (NOPAT), which is equal to the after-tax operating cash generated by the business, excluding non-recurring losses and gains, financing costs, and goodwill amortization and including the compensation cost of employee stock options (ESOs).
2. Calculation of Invested Capital or all capital invested in the company over its lifetime without regard to financing form, accounting name, or business purpose.
3. Business combinations, acquisitions and mergers.
4. Policies for accounting for operating expenses, especially those that relate to research, development and any other capital expenses.
5. Policies for recording the write-down or impairment of owned or acquired assets such as intellectual property or other property, plant and equipment.
6. Policies for accounting for capital leases and operating leases.
7. Policies for accounting for the issuance of Employee Stock Options.
8. Excess cash held by the business.
9. Policies for accounting for deferred taxes.
10. Policies for accounting for inventories.
11. Policies for recording revenue.

The MaxVal™ model has inputs for every adjustment needed to translate accounting disclosure to economic analysis. Hence, the MaxVal™ model guides the analyst through performing a proper translation. Likewise, the model may also include additional translations as necessary to account for other distortions.

Step Three—Using the MaxVal™ Model to Translate Accounting Disclosure to Economic Analysis With the data gathered in Steps One and Two, analysts can use the MaxVal™ model to perform an automatic translation of the accounting disclosure into an economic analysis. Once a proper economic history has been developed, the MaxVal™ model quantifies the future economic cash flows required to justify asset prices. The process for using the MaxVal™ is detailed below.

The MaxVal™ model is divided into three sections:

I. Input pages—where disclosed financial data is entered into the model along with forecasts for future financial performance.
   A. 'Decision' page—basic company data is entered on this page, such as the company name, ticker, current stock price, target price and brief business description.

B. 'Input_IS' page—all income statement data is entered on this page along with data from the Notes to financial statements on any operating leases the company may employ.

C. 'Input_BS' page—all balance sheet and cash flow data from the financial statements along with any data from the Notes to the Financial Statements needed to adjust the financial statements.

D. 'Forecast-Mkt' page—market consensus forecasts for future earnings, NOPAT and Invested capital that drive the calculation of future free cash flows and economic profits based on market expectations as reflected by consensus estimates provided by the Wall Street analyst community which are aggregated and offered by data vendors like First Call. (There are people in the investment community that question the validity of the 'consensus' forecasts provided by the current data vendors because of the noise related to the inputs from analysts whose numbers may be out of date or wildly different from other, thus skewing the mean.)

E. 'Forecast-Investor' page—the analysts' forecasts for future earnings, NOPAT and Invested capital drive the calculation of future value according to the forecasts of the analysts using the model. Importantly, this page allows analysts to analyze simultaneously any difference between his forecasts and those of the overall market.

F. 'ESO' page—this page takes all the inputs required to calculate the value of Employee Stock Option grants as well as the value that all outstanding Employee Stock Options claim on the future cash flows of the business.

G. WACC—all data required to calculate the weighted-average cost of capital according to the Capital Asset Pricing model is entered on this page.

II. Calculation Pages

A. 'PVLeases' page—calculates the impact that the conversion of operating leases to capital leases has on both NOPAT and Invested Capital Calculations.

B. 'NOPAT' page—calculates NOPAT using data from the input pages as well as calculations from both the 'NOPAT' and the 'InvCap' pages. See FIG. 12. Both calculations of NOPAT should equal each other and the MaxVal™ model will alert the analysts if the calculations are out of balance. Adjustments made to NOPAT that reflect the translation of accounting data for economic analysis of a company's performance include but are not limited to:
1. Capitalized expenses
2. Income from Unconsolidated subsidiaries
3. Restructuring/Non-recurring charges
4. All non-operating items are below EBIT
5. All after-tax items
6. Value of Employee Stock Options (ESOs) issued in a given year
7. Operating Leases
8. Cash Operating taxes—which adjusts the reported income tax number to more accurately reflect the true cash taxes owed on the operating profit of the business
9. Any other adjustments to reported accounting data that are required to present a more economic view of the Net Operating profit After Tax of a business in a given time period.

The MaxVal™ model typically ensures consistent treatment of these adjustments with respect to the calculation of both NOPAT and Invested Capital. In other words, the MaxVal™ model seeks to ensure that any adjustment made to NOPAT is properly reflected in the calculation of Invested Capital. For example, when Goodwill expense is removed from NOPAT, the related Accumulated Goodwill Amortization is added to Invested Capital. This methodology ensures that the all adjustments to the financial statements are not double-counted and that the ROIC (Return on Invested Capital) calculation has maximum integrity.

C. 'InvCap' page—calculates invested capital using data from the input pages as well as calculations from both the 'NOPAT' and the 'InvCap' pages. See FIG. 13. Both calculations of Invested Capital should equal each other and the MaxVal™ model will alert the analysts if the calculations are out of balance. Adjustments made to Invested Capital that reflect the translation of accounting data for economic analysis of a company's performance include but are not limited to:
1. Capitalized expenses
2. Excess Cash
3. LIFO Reserve
4. Accumulated Goodwill amortization
5. Unrecorded Goodwill
6. After-tax portion of asset-write downs
7. Investments in Unconsolidated Subs./Minority Interests
8. Unrealized (Gains)/Losses on Investments
9. Under-funded pension liabilities/over-funded pension assets
10. Any other adjustment to the reported accounting data required to more accurately reflect the capital invested in a given business over a given time period.

D. 'DCF-Mkt' page—calculates the value of the company analyzed based on the market's forecasts. See FIGS. 14 and 15. Both calculations of the value of the business should equal each other and the MaxVal™ model will alert the analysts if the calculations are out of balance.

E. 'DCF-Investor' page—calculates the value of the company analyzed based on the analyst's forecasts. See FIGS. 14 and 15. Both calculations of the value of the business should equal each other and the MaxVal™ model will alert the analysts if the calculations are out of balance.

FIG. 12 shows how the after-tax operating cash generated by the business, excluding non-recurring losses and gains, financing costs, and goodwill amortization and including the compensation cost of employee stock options (ESOs) can be calculated two ways. First, on an operating basis, in which operating expenses and the value of ESOs are deducted from net revenues, to yield EBIT. EBIT plus Amortization yields EBITA, to which an Adjustment for Capitalized Expenses and Income Equivalents are added to yield NOPBT. NOPBT less Cash Operating Taxes yields NOPAT. Using a Financing method, Net Income plus an Adjustment for Capitalized Expenses yields Adjusted New Income, to which an Increase in Equity Equivalents is added and the Value of ESOs deducted to yield Income Available to Common. Other Income and Interest Expense After Taxes are added to Income Available to Common to yield NOPAT.

Figure 13:
FIG. 13 shows the calculation of invested capital: The sum of all cash that has been invested in a company's net assets over its life without regard to financing form, accounting name, or business purpose.

FIG. 13 shows the calculation of Invested Capital, which is the sum of all cash that has been invested in a company's net assets over its life without regard to financing form, accounting name, or business purpose. It is the total of investments in the business from which revenue is derived. It can be calculated two ways: On an operating basis, the Current Assets less NIBCLS yields Net Working Capital, to which Tangible Assets, Intangible Assets and Other additions are made, to yield Invested Capital. Likewise, on a financing basis, Short Term Debt, Long Term Debt and Leases are added to yield Total Debt and Leases. The Total Debt and Leases is added to Equity Equivalents and Common Equity to yield Invested Capital.

FIG. 14 shows a method for calculating the value of the business: Each DCF page quantifies the cash flows produced during a company's Growth Appreciation Period (GAP), which represent the value of the company's assets. It can be calculated based on free cash flows or economic profits. In a free cash flows method, the cumulative free cash flow generated during the business' GAP is discounted by WACC to present value is added to the Perpetuity Value of free cash flows generated at the end of the business' GAP discounted by WACC to present value, to yield the present value of the business' total cash profits. In an economic profits method, the cumulative economic profits generated during the business' GAP discounted by WACC to present value is added to the Perpetuity Value of economic profits generated at the end of the business' GAP discounted by WACC to present value and all capital invested in the business prior to the creation of future economic profits, to yield the present value of the business' total cash profits.

In both approaches, it is important to note that the Perpetuity Values used to value the business assume that the business being valued does not create any more incremental value in the period of time following the Growth Appreciation Period. In other words, the Perpetuity Value at the end of the GAP assumes that returns on future incremental investments equal the cost of capital and are value neutral. This calculation of the Perpetuity Value is what enables the model to define GAP as the period of time into the future that a company can grow profits in the form of economic profits or free cash flow. In order for this valuation framework to have integrity, the model must be able to specifically define when a company does and does not create economic value.

In addition to a vigorous historical analysis of a company's ability to create value, the discounted cash flow analysis in MaxVal™ also specifically defines the length of time a business creates or destroys value. The length of time a business creates incremental value into the future is what we call the Growth Appreciation Period. The length of time a business destroys incremental value into the future is called the Growth Depreciation Period. This metric is critical to quantifying the expectations embedded in asset prices since it quantifies the sustainability of a given assets profits and cash flows.

FIG. 15 shows a method for calculating the Value available to Shareholders, which Quantifies the value created by the business that is available to shareholders. The present value of the business' total cash profits is added to excess cash and the current value of unconsolidated subsidiaries, from which the current value of preferred stock, current value of total debt owed creditors, current value of minority interests and current value of outstanding employee stock options are deducted, to yield Shareholder Value. The Shareholder Value divided by the number of basic shares outstanding yields the value of each share outstanding.

Note that the discounted cash flow models in the MaxVal™ model are dynamic and calculate the value of the company and the attendant value available to shareholders for multiple Growth Appreciation Periods.

Figure 16:
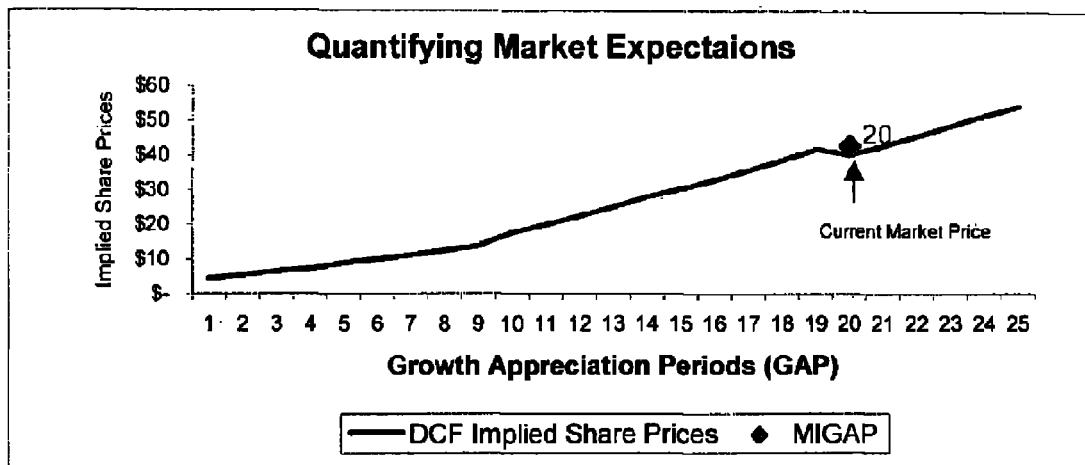
FIG. 16 shows a plot of the results of the dynamic discounted cash flow calculations, resulting from a calculation by the model of the GAP implied by the current stock price.

FIG. 16 shows a graphic representation of how the MaxVal™ model's dynamic discounted cash flow analysis calculates the value of a business and the attendant value available to shareholders for multiple Growth Appreciation Periods. This chart shows how the value of the company analyzed in this example rises as its Growth Appreciation Period increases. We note that the value of a business may not rise during its GAP, which is why we define the Growth Depreciation Period (GDP) as the amount of time into the future a business may destroy incremental value. Particularly important is the MaxVal™ model's ability to present the value of a business, given so many different scenarios for GAP (or GDP), revenue growth and profitability. The MIGAP equals the Market-Implied Growth Appreciation Period implied by the current market price. The MaxVal™ model calculates the MIGAP by matching the current stock price with the year into the future in which the value available to shareholders calculated by the DCF matches that of the current stock price. For example, the MIGAP for the company in FIG. 16 is 20 years. The MaxVal™ model also calculates the GAP implied for target prices simultaneously and can calculate GAPs implied by different stock prices no matter how great they may be. The analysis in FIG. 16 shows DCF values for only 25 years though the model values companies over an indefinite time period.

III. Presentation and Display pages show the results of data inputs and calculations.
   A. 'Decision' page—shows the results of both the 'DCF-Mkt' and DCF-Investor' pages along with many other pertinent calculations.
   B. 'Charts-Mkt' page—shows the annual results of the 'Forecast-Mkt' and 'DCF-Mkt' pages.
   C. 'Charts-Investor' page—shows the annual results of the 'Forecast-Investor' and 'DCF-Investor' pages.
   D. 'Charts-Qrtly-Mkt' page—shows the annual results of the 'Forecast-Mkt' and 'DCF-Mkt' pages.
   E. 'Charts-Qrtly-Investor' page—shows the annual results of the 'Forecast-Investor' and 'DCF-Investor' pages.

Step Four—Using the MaxVal™ Model to Analyze the Cash Value of Companies and Value Available to Shareholders Reviewing calculation and display pages allows the analyst to analyze the value of the company and the value available to shareholders. The analyst can use the MaxVal™ model to analyze the impact of different forecasts (perform multiple scenario analyses) by changing inputs to either the 'Forecast-Mkt' and 'Forecast-DCF' pages. The results of changes in these forecasts are immediately reflected in the respective calculation and display pages. Importantly, the results of the model enable the analyst using the model to determine whether the expectations embedded in the either the current market prices or his target price encourage him to take a position in the stock. See FIG. 17.

One of the prime benefits of valuation approach according to the present invention is that it allows analysts to spend more time on strategic analysis and less on modeling and valuation. In theory, 80 percent of an analyst's time should be spent researching a company's strategy, it's strategic position within its industry, and the macro trends affecting the sector of the economy in which it competes. 10 percent of an analyst's time should be spent analyzing a company's economics. The remaining 10 percent should be spent quantifying market expectations. The sum of this work positions the analyst to determine whether or not he or she feels market expectations are too high, too low or just about right.

Figure 17:
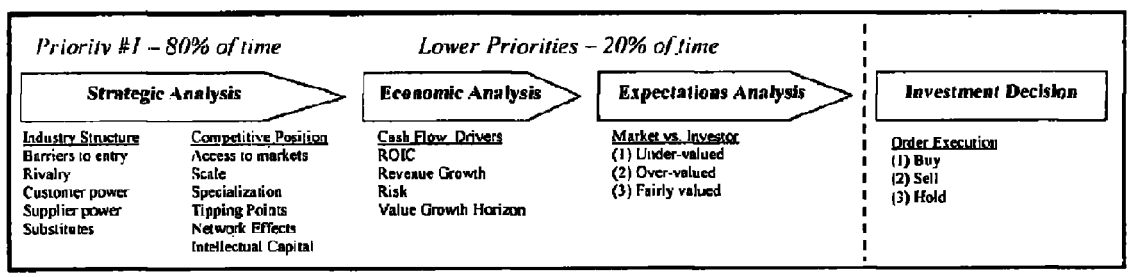
FIG. 17 shows a schematic diagram representing a market investment decision making process.

FIG. 17 shows the investment decision-making process, as assisted by the MaxVal™ model. The highest priority, for which an analyst should devote about 80% of his or her time, is a strategic analysis of the industry structure, barriers to entry, rivalry, customer power, supplier power, and substitutes, as well as the competitive position, access to markets, scale, specialization, tipping points, network effects and intellectual capital. The lower priority analyses, which should consume about 20% of the analyst's time, are an economic analysis, which includes cash flow drivers, ROIC, revenue growth, risk and value growth horizon, and an expectations analysis (market vs. investor), in which an equity may be considered over-valued, under-valued or fairly priced. These analyses ultimately are used to make an investment decision, such as an order execution to buy or sell, or a decision to hold a security. It is noted that the MaxVal™ model may also be used for other investment related decisions. For example, a corporation may employ the MaxVal™ model to analyze its own business to assist in making strategic decisions. An analyst may also use the MaxVal™ model to hedge with respect to changes in economic conditions. Upon completion of these three analyses, the analyst should be prepared to make an investment related decision.

Many aspects of the present invention employ known techniques, although employed in different contexts herein. Therefore, it is understood that these known and techniques and those associated with them may be employed in conjunction with the present invention, to the extent consistent therewith. It is also understood that the various aspects of the invention may be employed together, individually or in subcombination.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

APPENDIX 1

Definitions of Terms Used in the MaxVal™ Models

Invested Capital: The sum of all cash that has been invested in a company's net assets over its life and without regard to financing form, accounting name, or business purpose. It is the total of investments in the business from which revenue is derived. It can be calculated two ways, as shown in FIG. 13.

NOPAT: The after-tax operating cash generated by the business, excluding non-recurring losses and gains, financing costs, and goodwill amortization and including the compensation cost of employee stock options (ESOs). It can be calculated two ways, as shown in FIG. 12.

Free Cash Flow: Reflects the amount of cash free for distribution to both debt and equity shareholders. It is calculated by subtracting the change in Invested Capital from NOPAT.

ROIC: Return on Invested Capital (ROIC) is the true measure of a business' profitability. It represents the cash flow derived from all capital invested in the business. It is equal to NOPAT divided by Invested Capital.

WACC: Weighted-Average Cost of Capital (WACC) is the average of debt and equity capital costs that all publicly traded companies with debt and equity stakeholders incur as a cost of operating. The cost of debt capital is equal to a businesses long-term marginal borrowing rate. The cost of equity is calculated using the Capital Asset Pricing model. Though there are many other more complicated approaches for arriving at a firm's cost of equity, we do not feel their additional complexity offers commensurate accuracy. CAPM is simple, gets us close enough and it is easy to implement.

Risk-Adjusted Returns: ROIC minus WACC equals the truest measure of a businesses profitability. This metric accounts for the cash flow returns adjusted for the risk associated with the business model employed to achieve those returns. In essence, Risk-Adjusted Returns precisely measure a firm's ability to create value for its stakeholders.

(GAP) Growth Appreciation Period: The Growth Appreciation Period is the amount of time (usually expressed in years) that a business can earn ROIC greater than WACC on new investments. Put simply, GAP is the amount of time a business can GROW its economic cash flow. After the GAP, it is assumed that incremental investments by the business earn ROIC equal to WACC. GAP is also known as CAP (Competitive Advantage Period).

The dynamic DCF model provides possible share prices for 100 or more different growth appreciation period scenarios.

For example, the value of the company in the twentieth forecasted year assumes the company will enjoy twenty-year GAP. Without a model that encompasses this long-term approach, we may not be able to capture the market's true expectations for many companies.

(GDP) Growth Depreciation Period: GDP is the amount of time a business destroys incremental value by allocating capital to projects that earn returns below WACC.

Market-Implied GAP: MIGAP is the number of years that a company's stock market price implies it will earn ROIC greater than WACC on incremental investments. Provided that the estimates entered on the forecast page are based on consensus projections, the MIGAP represents the forecast horizon needed in a DCF model to arrive at a value equal to the current market price.

Economic Profits or Economic Cash Flows: Quantifies the amount of shareholder value a company creates or destroys. It can be calculated two ways:

Residual income approach:

$$\text{Economic Profit} = (\text{ROIC} - \text{WACC}) * \text{Invested Capital}$$

Refined earnings approach:

$$\text{Economic Profit} = \text{NOPAT} - (\text{Invested Capital} * \text{WACC})$$

Value of any asset: Quantifies the cash flows that represent the value of any asset. It can be calculated based on free cash flows or economic profits, as shown in FIG. 14.

Value available to Shareholders: Quantifies the value created by the business that is available to shareholders, as shown in FIG. 15.

What is claimed is:

1. A method, using a specifically programmed computer, for reversing accounting distortions of financial information, comprising the steps of:

(a) obtaining by said computer, a set of financial information regarding an entity, the financial information comprising at least earnings and including accounting distortions, and notes detailing said accounting distortions;

(b) analyzing by said computer, the financial information and notes to determine an economic model which quantitatively corrects for the accounting distortions of the financial information to produce information regarding at least cash flows and profits;

(c) using said computer, said economic model to automatically comparatively value a plurality of expectations with respect to the financial information, and (d) at least one of storing and communicating information derived based on the automatic comparative valuation.

2. The method according to claim 1, wherein said financial information comprises publicly reported financial information.

3. The method according to claim 1, wherein said financial information comprises documents filed with the U.S. Securities and Exchange Commission.

4. The method according to claim 1, wherein said financial information comprises press releases or other published documents.

5. The method according to claim 1, wherein said financial information relates to a publicly traded corporation.

6. The method according to claim 1, wherein said financial information comprises a series of historical datum regarding a respective parameter.

7. The method according to claim 1, wherein said notes comprise information relating to employee stock options.

8. The method according to claim 1, wherein said notes comprise information relating to goodwill.

9. The method according to claim 1, wherein said notes comprise information relating to intangibles.

10. The method according to claim 1, wherein said notes comprise information relating to mergers and acquisitions.

11. The method according to claim 1, wherein said notes comprise information relating to employee pensions.

12. The method according to claim 1, wherein said notes comprise information relating to debt covenants.

13. The method according to claim 1, wherein said notes comprise information relating to capital leases.

14. The method according to claim 1, wherein said notes comprise information relating to operating leases.

15. The method according to claim 1, wherein said notes comprise information relating to revenues.

16. The method according to claim 1, wherein said notes comprise information relating to deferred revenues.

17. The method according to claim 1, wherein said notes comprise information relating to barter transactions.

18. The method according to claim 1, wherein said notes comprise information relating to contingent liabilities.

19. The method according to claim 1, wherein said notes comprise information relating to accrued reserves.

20. The method according to claim 1, wherein said notes comprise information relating to loan loss reserves.

21. The method according to claim 1, wherein said notes comprise information relating to realized and unrealized gains on securities held to maturity or available for sale.

22. The method according to claim 1, wherein said notes comprise information relating to restructuring.

23. The method according to claim 1, wherein said notes comprise information relating to non-recurring gains and losses.

24. The method according to claim 1, wherein said notes comprise information relating to deferred taxes.

25. The method according to claim 1, wherein said notes comprise information relating to convertible debt and preferred stock.

26. The method according to claim 1, wherein said economic model comprises a computer spreadsheet.

27. The method according to claim 1, wherein said economic model is used to produce a graphic output of profitability.

28. The method according to claim 1, wherein said economic model is used to produce a graphic output of value associated with the entity.

29. The method according to claim 1, further comprising the step of using said computer to produce a graphic output of at least one set of parameters included within said economic model based on an ad hoc request from a user.

30. The method according to claim 1, wherein said economic model is used to produce a graphic output representing a plot of a plurality of sets of expectations, each differing with respect to at least one parameter.

31. The method according to claim 1, wherein said plurality of expectations comprises an anticipated revenue growth.

32. The method according to claim 1, wherein said plurality of expectations comprises an anticipated profitability.

33. The method according to claim 1, wherein said plurality of expectations comprises an anticipated sustainability of profitable growth.

34. The method according to claim 1, wherein said plurality of expectations comprises at least one parameter selected from the group consisting of a value and/or margin of operating profit, gross, earnings before interest taxes and amortization, earnings before interest taxes depreciation and amortization, taxes, and net operating profit after tax.

35. The method according to claim 1, wherein said plurality of expectations comprises at least one parameter selected from the group consisting of a value and/or ratio of change in value to change in revenue and/or ratio of revenue to value or net working capital, adjusted net working capital, fixed assets, adjusted fixed assets, invested capital and adjusted invested capital, all current asset items, all fixed asset items, all current liability items, all long term liability items, total assets, and adjusted total assets.

36. The method according to claim 1, wherein said comparative valuation of a plurality of expectations with respect to the financial information are presented as a chart.

37. The method according to claim 1, wherein said comparative valuation of a plurality of expectations with respect to the financial information are presented as an output graph.

38. The method according to claim 1, wherein said model automatically calculates a minimum future target price of an asset that is required to justify a long or short investment in the entity.

39. The method according to claim 1, wherein said model automatically calculates the future performance required to justify a target price of an instrument reflecting a value of the entity.

40. A system for reversing accounting distortions of financial information, comprising:
(a) an input for receiving a set of financial information regarding an entity, the financial information comprising at least a report of earnings in accordance with accounting principles including accounting distortions, and notes detailing said accounting distortions;
(b) a memory for storing a model for providing a quantitative economic analysis of the financial information and notes, which analytically removes said accounting distortions resulting in at least information defining economic profits and cash flows directly corresponding to the financial information;
(c) a processor, accessing said stored model in memory and using said model to automatically comparatively value a plurality of expectations with respect to the financial information; and
(d) an output for outputting information relating to the valuation of the plurality of expectations.

41. The system according to claim 40, wherein said financial information comprises information selected from the group consisting of one or more of publicly reported financial information, documents filed with the U.S. Securities and Exchange Commission, press releases or other published documents, information relating to a publicly traded corporation, and a series of historical datum regarding a respective parameter.

42. The system according to claim 40, wherein said notes comprise information relating to one or more of the group consisting of employee stock options, goodwill, intangibles, mergers and acquisitions, employee pensions, debt covenants, capital leases, operating leases, revenues, deferred revenues, barter transactions, contingent liabilities, accrued reserves, loan loss reserves, realized and unrealized gains on securities held to maturity or available for sale, restructuring, non-recurring gains and losses, deferred taxes, and convertible debt and preferred stock.

43. The system according to claim 40, wherein said model is stored in memory as a computer spreadsheet.

44. The system according to claim 40, wherein said economic model is used to produce a graphic output of profitability.

45. The system according to claim 40, wherein said output comprises a graph of at least one of a value of the entity and a plurality of sets of expectations, each differing with respect to at least one parameter.

46. The system according to claim 40, wherein said output comprises a graphic representation of at least one set of parameters of said model based on an ad hoc request received from a user.

47. The system according to claim 40, wherein said plurality of expectations comprises at least one of an anticipated revenue growth, an anticipated profitability, an anticipated sustainability of profitable growth, a value and/or margin of operating profit, gross, earnings before interest taxes and amortization, earnings before interest taxes depreciation and amortization, taxes, and net operating profit after tax, and a value and/or ratio of change in value to change in revenue and/or ratio of revenue to value or net working capital, adjusted net working capital, fixed assets, adjusted fixed assets, invested capital and adjusted invested capital, all current asset items, all fixed asset items, all current liability items, all long term liability items, total assets, and adjusted total assets.

48. The system according to claim 40, wherein said output represents the information relating to the valuation as a chart or a graph.

49. The system according to claim 40, wherein said processor further calculates a minimum future target price of an asset that is required to justify a long or short investment in the entity or a future performance required to justify a target price of an instrument reflecting a value of the entity.

50. A method, using a specifically programmed computer, for reversing accounting distortions of financial information, comprising the steps of:
   (a) obtaining, by said computer, a set of financial information regarding an entity, the financial information comprising at least earnings reports prepared in accordance with accounting practices which contain accounting distortions with respect to an economic profitability of the entity, and notes detailing said accounting distortions;
   (b) analyzing, by said computer, the financial information and notes with an automated processor to determine a quantitative economic model which adjust for said accounting distortions to extract at least the economic profitability of the entity corresponding to the set of financial information;
   (c) using, by said computer, said quantitative economic model to automatically calculate a parameter selected from the group consisting of comparative value of a plurality of expectations with respect to the financial information, a minimum future target price of an asset that is required to justify a long or short investment in the entity and a future performance required to justify a target price of an instrument reflecting a value of the entity; and
   (d) at least one of storing the calculated parameter in a memory and outputting the calculated parameter through an output.

51. The method according to claim 50, further comprising:
   (a) receiving a set of financial information regarding an entity through an input, the financial information including accounting distortions and notes detailing said accounting distortions;
   (b) storing a model for providing a quantitative economic analysis of the financial information and notes in a memory;
   (c) accessing said stored model in memory and using said model to automatically calculate a parameter selected from the group consisting of comparative value of a plurality of expectations with respect to the financial information, a minimum future target price of an asset that is required to justify a long or short investment in the entity and a future performance required to justify a target price of an instrument reflecting a value of the entity; and
   (d) outputting information relating to said automatic calculation through an output.

52. A computer readable medium containing computer instructions for controlling a general purpose computer to perform a method for reversing accounting distortions of financial information derived from reported financial performance according to standardized accounting principles, comprising the steps of:
   (a) obtaining a set of financial information regarding an entity derived from reported financial performance according to standardized accounting principles, the financial information including accounting distortions and notes detailing said accounting distortions;
   (b) analyzing the financial information and notes to determine a quantitative economic model which reverses said accounting distortions; and
   (c) using said quantitative economic model to determine at least an economic profitability and an economic cash flow for the entity, and to automatically calculate a parameter selected from the group consisting of comparative value of a plurality of expectations with respect to the financial information, a minimum future target price of an asset that is required to justify a long or short investment in the entity and a future performance required to justify a target price of an instrument reflecting a value of the entity.

53. A method, using a specifically programmed computer, for converting accounting information into economic profitability information, comprising the steps of:
   (a) obtaining, by said computer, a set of accounting information for an economic unit derived from financial reports prepared according to standardized accounting principles for the economic unit and reporting at least accounting earnings for the unit;
   (b) recognizing, by said computer, economic distortions in the accounting information;
   (c) automatically translating, by said computer, the set of accounting information having the recognized economic distortions with an automated processor, to produce economic profitability information for the economic unit based on at least the accounting earnings, and the standardized accounting principles;
   (d) using the economic profitability information, by said computer, to determine the economic performance implied by a valuation of the economic unit, under at least one future financial scenario; and (e) at least one of saving in a memory and communicating to an output information dependent on the determined economic performance implied by the valuation of the economic unit.

54. A method, using a specifically programmed computer, of analyzing accounting information associated with a business entity, the accounting information including financial statements and notes prepared in accordance with generally accepted accounting principles and reporting at least accounting earnings, comprising:
   (a) modeling economic cash flows of the business entity, by said computer, based on at least the reported at least accounting earnings by recognizing and accounting for distortions present in the financial statements and notes for the business entity prepared according to standard accounting principles;
   (b) determining with a processor a present implied set of financial performance parameters required to justify a present market valuation of the business entity;
   (c) modifying, by said computer, at least one parameter of the set of financial performance parameters based on a differing belief in future market performance associated with the business entity, than that implicit in the present market valuation; and
   (d) outputting information selectively dependent on a determination of the impact on the value of the business entity based on the modification in the at least one parameter.

55. A method, using a specifically programmed computer, for presenting market-implied future performance parameters for an entity to a user with accounting distortions of financial information reversed, comprising:
   (a) extracting, by said computer, quantitative market-implied future economic performance parameters from accounting reports comprising at least a balance sheet, and having accounting distortions, based on standardized accounting principles, consensus forecasts for financial performance, and market price for an entity;
   (b) receiving, by said computer, from the user a plurality of differing financial performance parameters;
   (c) automatically quantitatively modeling with said computer, the future performance of the entity, based on the future economic performance parameters, to produce a quantitative economic model for the entity comprising at least an economic cash flow; and
   (d) presenting through a user interface future profitability, future growth, and duration of future profit growth parameters to the user based on the plurality of differing financial performance parameters and the automatic quantitative modeling.

56. A method for reversing accounting distortions of financial information, using a specifically programmed computer, comprising the steps of:
   (a) obtaining by said computer a set of financial information regarding an entity, the financial information including accounting distortions of at least economic profitability expressed as accounting earnings, and notes detailing said accounting distortions;
   (b) analyzing by said computer the financial information and notes to determine an economic model which quantitatively accounts for said accounting distortions to yield at least economic profitability;
   (c) using said computer to access accessing said economic model which quantitatively accounts for said economic distortions by an automated computer to automatically value an entity whose operations are described by the financial information based on at least one set of future expectations; and
   (d) using said computer to communicate communicating data dependent on said use of said economic model through an output.

* * * * *

UNITED STATES PATENT AND TRADEMARK OFFICE
CERTIFICATE OF CORRECTION

PATENT NO. : 7,752,090 B2  Page 1 of 1
APPLICATION NO. : 10/636932
DATED : July 6, 2010
INVENTOR(S) : David Trainer It is certified that error appears in the above-identified patent and that said Letters Patent is hereby corrected as shown below:

Column 8, ln. 43, "operating profit, gross, earnings before interest taxes and" should read "operating profit, gross profit, earnings before interest taxes and";

Column 9, ln. 46, "Justify" should read "justify";

Claim 34, ln. 13, "profit, gross, earnings before interest taxes and" should read "profit, gross profit, earnings before interest taxes and";

Claim 47, ln. 26, "operating profit, gross, earnings before interest taxes and" should read "operating profit, gross profit, earnings before interest taxes and";

Claim 56, ln. 27, "access accessing" should read "access" only; and

Claim 56, ln. 33, "communicate communicating" should read "communicate" only.

Signed and Sealed this

Thirty-first Day of August, 2010

David J. Kappos
*Director of the United States Patent and Trademark Office*